(12) United States Patent
Kolluru et al.

(10) Patent No.: US 11,210,618 B2
(45) Date of Patent: Dec. 28, 2021

(54) SYSTEMS AND METHODS FOR GENERATING A TWO-DIMENSIONAL PLANOGRAM BASED ON INTERMEDIATE DATA STRUCTURES

(71) Applicant: Walmart Apollo, LLC, Bentonville, AR (US)

(72) Inventors: Murthy Narayana Kolluru, Bentonville, AR (US); Manisha Goswami, Bentonville, AR (US); Ehsan Nazarian, Rogers, AR (US); Paul Michael Tempest, Rogers, AR (US); Rajesh Veliyanallore, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 175 days.

(21) Appl. No.: 16/508,070

(22) Filed: Jul. 10, 2019

(65) Prior Publication Data
US 2020/0019908 A1      Jan. 16, 2020

Related U.S. Application Data

(60) Provisional application No. 62/696,203, filed on Jul. 10, 2018.

(51) Int. Cl.
| | |
|---|---|
| *G06Q 10/00* | (2012.01) |
| *G06Q 10/06* | (2012.01) |
| *G06Q 30/02* | (2012.01) |
| *G06K 9/62* | (2006.01) |
| *G06Q 30/06* | (2012.01) |
| *G06Q 10/08* | (2012.01) |

(52) U.S. Cl.
CPC ..... *G06Q 10/06315* (2013.01); *G06K 9/6219* (2013.01); *G06K 9/6282* (2013.01); *G06Q 10/0875* (2013.01); *G06Q 30/0201* (2013.01); *G06Q 30/0202* (2013.01); *G06Q 30/0639* (2013.01)

(58) Field of Classification Search
None
See application file for complete search history.

(56) References Cited

U.S. PATENT DOCUMENTS

| | | | | |
|---|---|---|---|---|
| 7,533,036 | B2 * | 5/2009 | Bamberg | G06Q 10/06 705/7.33 |
| 7,734,495 | B2 * | 6/2010 | Klaubauf | G06Q 30/0202 705/7.25 |
| 8,108,193 | B2 * | 1/2012 | Chu | G06Q 10/06 703/13 |
| 8,224,472 | B1 * | 7/2012 | Maluf | G06Q 10/063116 700/97 |

(Continued)

OTHER PUBLICATIONS

Why Planograms Are so Significant to Retail Sales Plan, Mar. 2015, DotACtiv, https://www.dotactiv.com/blog/why-planograms, p. 1-14 (Year: 2015).*

(Continued)

*Primary Examiner* — Joseph M Waesco
(74) *Attorney, Agent, or Firm* — Fitch, Even, Tabin & Flannery LLP

(57) ABSTRACT

A system for generating a two-dimensional planogram. The system generates, for a facility in a cluster of facilities, a planogram for sets of items using an intermediate file.

20 Claims, 13 Drawing Sheets

(56) References Cited

U.S. PATENT DOCUMENTS

| | | |
|---|---|---|
| 8,285,584 B2 | 10/2012 | Fotteler et al. |
| 8,417,559 B2 | 4/2013 | Joshi et al. |
| 8,838,469 B2 | 9/2014 | Bottom |
| 10,535,198 B2* | 1/2020 | Enssle ................ G06F 3/011 |
| 2003/0171978 A1 | 9/2003 | Jenkins et al. |
| 2005/0182647 A1* | 8/2005 | Saenz ............ G06Q 30/0264 |
| | | 705/345 |
| 2007/0293958 A1* | 12/2007 | Stehle ............ G06Q 30/0207 |
| | | 700/30 |
| 2008/0270363 A1* | 10/2008 | Hunt ................ G06F 16/2462 |
| 2008/0288889 A1* | 11/2008 | Hunt .................. G06Q 30/02 |
| | | 715/810 |
| 2008/0294996 A1 | 11/2008 | Hunt et al. |
| 2009/0059270 A1 | 3/2009 | Opalach et al. |
| 2009/0125350 A1 | 5/2009 | Lessing et al. |
| 2010/0057415 A1* | 3/2010 | Chu .................. G06Q 10/06 |
| | | 703/6 |
| 2010/0179885 A1* | 7/2010 | Fiorentino ............ G06Q 30/02 |
| | | 705/26.1 |
| 2011/0040636 A1* | 2/2011 | Simmons .......... G06Q 30/0243 |
| | | 705/14.71 |
| 2011/0261049 A1* | 10/2011 | Cardno ................ G06Q 10/10 |
| | | 345/419 |
| 2012/0035839 A1* | 2/2012 | Stehle .................. G06Q 10/04 |
| | | 701/117 |
| 2012/0323674 A1* | 12/2012 | Simmons ........... G06Q 30/0249 |
| | | 705/14.41 |
| 2013/0339083 A1* | 12/2013 | Baier ................ G06Q 30/02 |
| | | 705/7.29 |
| 2014/0003729 A1 | 1/2014 | Auclair et al. |
| 2014/0058781 A1 | 2/2014 | Padmanabhan et al. |
| 2014/0067467 A1* | 3/2014 | Rangarajan ............ G06Q 30/02 |
| | | 705/7.31 |
| 2014/0068448 A1* | 3/2014 | Plost ...................... G06Q 50/02 |
| | | 715/738 |
| 2014/0100769 A1* | 4/2014 | Wurman .................. B65G 1/10 |
| | | 701/301 |
| 2014/0278294 A1* | 9/2014 | Yeager ................... G06F 30/20 |
| | | 703/2 |
| 2014/0278771 A1* | 9/2014 | Rehman ................. G06F 16/23 |
| | | 705/7.31 |
| 2014/0324537 A1* | 10/2014 | Gilbert ............... G06Q 30/0201 |
| | | 705/7.31 |
| 2014/0344186 A1* | 11/2014 | Nadler ................. G06Q 10/067 |
| | | 705/36 R |
| 2015/0088701 A1 | 3/2015 | Desmarais et al. |
| 2015/0199627 A1* | 7/2015 | Gould ............. G06Q 10/0631 |
| | | 705/7.12 |
| 2015/0248630 A1 | 9/2015 | Ramanan et al. |
| 2015/0302205 A1* | 10/2015 | Milman .............. H04L 63/0209 |
| | | 726/26 |
| 2015/0304169 A1* | 10/2015 | Milman ........... H04L 63/0209 |
| | | 709/220 |
| 2016/0005090 A1* | 1/2016 | Vollenweider ........... G06N 5/02 |
| | | 705/26.4 |
| 2016/0063070 A1* | 3/2016 | Benum ............... G06F 16/2272 |
| | | 707/722 |
| 2016/0127010 A1* | 5/2016 | Rho ....................... G09B 5/065 |
| | | 375/257 |
| 2016/0292703 A1* | 10/2016 | Kolluru ............... G06Q 10/067 |
| 2016/0328788 A1 | 11/2016 | Soon-Shiong |
| 2017/0178061 A1 | 6/2017 | Griffin et al. |
| 2018/0293543 A1* | 10/2018 | Tiwari .................. G05D 1/0274 |
| 2019/0392506 A1* | 12/2019 | Bogolea ............ G06Q 30/0633 |

OTHER PUBLICATIONS

International Search Report and Written Opinion for PCT/US2019/41229, dated Oct. 1, 2019, pp. 1-20.

* cited by examiner

| Delete UPC | 187 |
|---|---|

| | Delete UPC attribute value | Substitution UPC match flag | | |
|---|---|---|---|---|
| Attributes | 187 | 815 | 814 | 821 |
| Keycat_size | ADJUSTABLE | 1 | 1 | 1 |
| Brand | ACE | 1 | 1 | 1 |
| Usage | KNEE | 1 | 1 | 1 |
| Product_type | MUSCLESUPPORTER | 1 | 1 | 1 |
| Form | BRACEWSTABILIZER | 1 | 1 | 1 |
| Closure | STRAP | 1 | 1 | 1 |
| Material | NEOPRENEBLEND | 1 | 1 | 1 |
| Package | PEGCARDBLISTERPCK | 1 | 1 | 1 |
| Knock_Off_Brand | 0 | 1 | 1 | 1 |
| User_Info | MULTIUSER | 1 | 1 | 1 |

FIG. 5B

PDH Score

| Attributes | Attribute score | Normalized score |
|---|---|---|
| Keycat_size | 8.05% | 11.33% |
| Brand | 8.02% | 11.28% |
| Usage | 7.75% | 10.90% |
| Product_type | 6.95% | 9.78% |
| Form | 7.36% | 10.35% |
| Closure | 7.22% | 10.16% |
| Material | 7.04% | 9.90% |
| Package | 6.42% | 9.03% |
| Knock_Off_Brand | 6.35% | 8.93% |
| User_Info | 5.92% | 8.33% |

FIG. 5C

Final Similarity index

| Attributes | | 187 | 815 | 814 | 821 |
|---|---|---|---|---|---|
| Keycat_size | ADJUSTABLE | | 11.33% | 11.33% | 11.33% |
| Brand | ACE | | 11.28% | 11.28% | 11.28% |
| Usage | KNEE | | 10.90% | 10.90% | 10.90% |
| Product_type | MUSCLESUPPORTER | | 9.78% | 9.78% | 9.78% |
| Form | BRACEWSTABILIZER | | 10.35% | 10.35% | 10.35% |
| Closure | STRAP | | 10.16% | 10.16% | 10.16% |
| Material | NEOPRENEBLEND | | 9.90% | 9.90% | 0.00% |
| Package | PEGCARDBLISTERPCK | | 9.03% | 9.03% | 9.03% |
| Knock_Off_Brand | | 0 | 8.93% | 8.93% | 8.93% |
| User_Info | MULTIUSER | | 8.33% | 8.33% | 8.33% |
| Similarity index | | | 100.00% | 100.00% | 90.10% |

FIG. 5D

| UPC | Qty of substitution UPC(Q) | Sales of substitution UPC | Sales of deleted UPD(Da) | Similarity index(SI) | Normalized unit sold of substitution UPC(Fa) | Total share(TS) | Share of delete UPC(Xa) | Substitution index(1-Xa) | Total Demand Transfer |
|---|---|---|---|---|---|---|---|---|---|
| 815 | 321 | $ 4121.64 | $ 2481.84 | 100% | 39% | $ 13435.71 | 0.18471 | 0.82 | $ 787.3 |
| 814 | 277 | $ 4138.38 | $ 2481.84 | 100% | 34% | $ 13435.71 | 0.18471 | 0.82 | $ 679.4 |
| 821 | 277 | $ 2693.85 | $ 2481.84 | 90% | 28% | $ 13435.71 | 0.18471 | 0.82 | $ 501.6 |
| Total Qty(TQ) | 825 | | | | | | | | |

FIG. 5E

| ID | Cluster_Nbr | Supercategory Number | Modular_Catg_nbr | UPC_CODE | Product Description | Case Size | UPC Score | Movement (With Transference) |
|---|---|---|---|---|---|---|---|---|
| 1_007262225030040 | 1 | 2 | 3 | 040 | MS ORANGE | 12 | 0.138106764 | 0.342711855 |
| 1_008038102328 | 1 | 2 | 3 | 288 | CHOC VP | 8 | 0.245935035 | 0.320754717 |
| 1_008038102329 | 1 | 2 | 3 | 289 | STRAW VP | 8 | 0.192607773 | 0.352941176 |
| 1_00072392295 | 1 | 2 | 3 | 599 | YOOHOO STG C | 12 | 0.014787169 | 0.245283019 |

FIG. 7A

| ID | Sales (With Transference) | HORIZ_FACE | Vertical Facings | HEIGHT | WIDTH | DEPTH | TRAY_HEIGHT | TRAY_WIDTH | TRAY_DEPTH |
|---|---|---|---|---|---|---|---|---|---|
| 1_007262225030040 | 279.254344 | 1 | 1 | 3.25 | 2.37 | 1.12 | 2.75 | 8.1 | 5 |
| 1_008038102328 | 268.92 | 1 | 1 | 8.25 | 2.45 | 1.9 | 2.75 | 14.25 | 8.45 |
| 1_008038102329 | 222.26 | 1 | 1 | 8.25 | 2.45 | 1.9 | 2.75 | 14.25 | 8.45 |
| 1_000723922959 | 13 | 1 | 1 | 4.8 | 3 | 1.1 | 3.25 | 6.45 | 4.9 |

FIG. 7B

SYSTEMS AND METHODS FOR GENERATING A TWO-DIMENSIONAL PLANOGRAM BASED ON INTERMEDIATE DATA STRUCTURES

CROSS-REFERENCE TO RELATED PATENT APPLICATIONS

This application claims priority to U.S., Provisional Patent Application No. 62/696,203, filed on Jul. 10, 2018, the content of which is hereby incorporated by reference in its entirety.

BACKGROUND

Generation of two-dimensional planogram images is often a tedious task requiring a large amount of resources. This can be particularly true as the number of facilities requiring planograms increases and the physical layout of the facilities are different.

BRIEF DESCRIPTION OF THE DRAWINGS

To assist those of skill in the art in making and using a planogram generation system and associated methods, reference is made to the accompanying figures. The accompanying figures, which are incorporated in and constitute a part of this specification, illustrate one or more embodiments of the present disclosure and, together with the description, help to explain embodiments of the present disclosure. Illustrative embodiments are shown by way of example in the accompanying drawings and should not be considered as limiting. In the figures:

FIGS. 5A-5E illustrate a process for determining demand transference used in the planogram generation system, in accordance with an exemplary embodiment;

FIGS. 7A-7B illustrate sample item details in an intermediate file, in accordance with an exemplary embodiment;

FIGS. 7C-1-7C-2 illustrate an example two-dimensional planogram image generated in accordance with embodiments of the present disclosure.

DETAILED DESCRIPTION OF EMBODIMENTS

Figure 1:
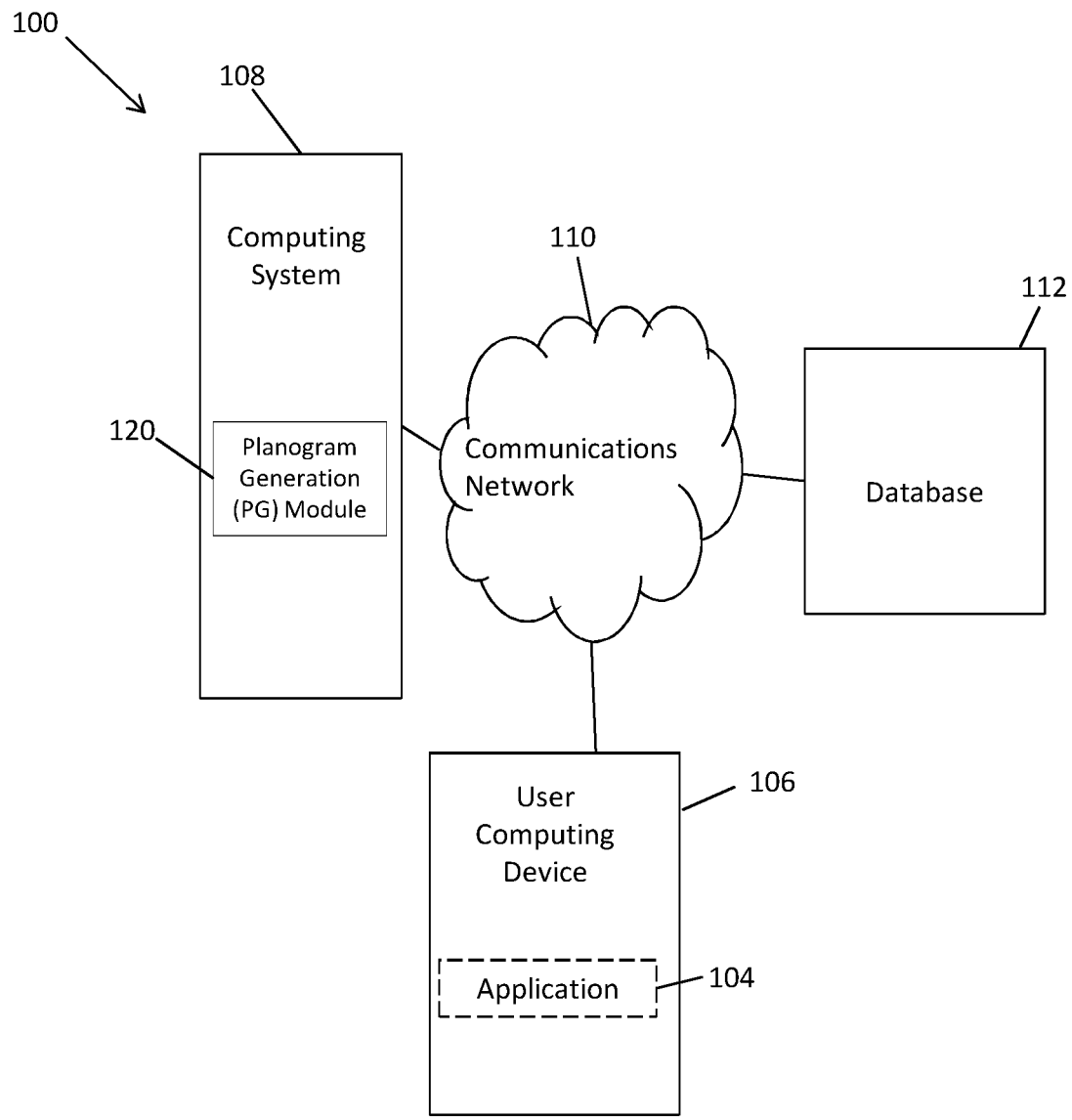
FIG. 1 illustrates an exemplary network environment suitable for a planogram generation system, in accordance with an exemplary embodiment.

Assortment in a retail facility is a collection of items carried by the retailer at a certain time. Some retailers have several thousand categories of products with millions of items. Each store often has a unique customer base with unique buying patterns. Therefore, product placement may be crucial for a retailer. However, it is difficult to manually manage item assortment and product placement on shelves for each store. Furthermore, making assortment decisions at an aggregated level may cause a loss of important information. Product placement and assortment can be mapped in a planogram, which represents a two-dimension data representation or image of a facility identifying where products should be located in a facility.

Systems and methods for generating a two-dimensional planogram are described herein. The system comprises facilities, each having fixtures disposed therein. The system further includes a storage device configured to store intermediate files. The system also includes a computing device equipped with a memory and a processor and configured to execute a planogram generation (PG) module. The PG module, when executed, determines, from the facilities, a cluster of facilities that share similar facility traits. Each facility of the cluster of facilities includes one or more items of a plurality of items. The PG module obtains a first specified percentage of items from one or more facilities that are not within the cluster of facilities. In some embodiments, the computing device is configured to receive user input to increase or decrease the first specified percentage of items.

The PG module generates, for a facility in the cluster of facilities, initial recommendations to add a first set of items from the first specified percentage of items, keep a second set of items from the plurality of items, and delete a third set of items from the plurality of items based on a performance of each item in the first specified percentage of items and/or a performance of each item in the plurality of items. The PG module stores, in the storage device, at least one intermediate file that includes the initial recommendations. The PG module analyzes each item in the third set of items for uniqueness based on predefined item attributes. The PG module determines demand transference of at least one first item in the third set of items onto at least one second item in the second set of items, wherein the at least one first item and the at least one second item share at least one item attribute. The PG module generates a final recommendations to add a modified first set of items from the first specified percentage of items, keep a modified second set of items from the plurality of items, and delete a modified third set of items from the plurality of items based on the performance of each item in the first specified percentage of items and/or the performance of each item in the plurality of items, the uniqueness of each item in the third set of items, and the demand transference. The PG module modifies the at least one intermediate file to include the final recommendations. The PG module recommends locations for the modified first set of items and the modified second set of items on fixtures within the facility. The PG module generates, based on the location recommendations, a planogram for the modified first set of items and the modified second set of items using the at least one intermediate file.

The PG module determines the demand transference by ranking the predefined item attributes for each of the items of the plurality of items based on levels of importance to customers using an item decision hierarchy or a similarity index, wherein the ranking is performed using transaction data to determine how customers are switching between items that include the predefined item attributes. The PG module uses the item decision hierarchy or the similarity index at an item pair level to generate a customer decision tree. The PG module identifies substitutable groups between items in the second set of items and items in the third set of items and demand transference within each substitutable group using the customer decision tree.

The PG module can determine the first set of items by identifying items within the first specified percentage of items as potential items to add to the facility. The PG module can determine the second set of items and the third set of items by determining a performance metric for each of the items of the plurality of items based on at least one of sales/linear feet, units/linear feet, and profit/linear feet. The PG module classifies a second specified percentage of items in the plurality of items as items to keep based on the performance metrics, wherein the second specified percentage of items is the second set of items. The PG module can classify a remainder of the plurality of items not within the second specified percentage of items as items to delete, wherein the reminder of the items is the third set of items.

The PG module may transmit the final recommendations to each facility in the cluster of facilities. Each facility in the cluster of facilities may then generate a planogram based on the final recommendations. In one embodiment, the system can include a mobile application. The PG module transmits at least one alert to the mobile application executing on a mobile computing device and associated with an individual in the facility. The alert may include an image of the planogram generated according to embodiments of the present disclosure. In another embodiment, the PG module transmits the alert to a facility manager for changing item placement on a fixture or transmits the alert to a replenishment manager for ordering the modified first set of items.

The PG module can generate the modified second set of items and the modified third set of items by transferring at least one item from the third set of items to the second set of items where the at least one item is unique, and/or deleting at least one item from the third set of items where the at least one item has a demand transference above a predefined threshold.

The system can generate a two-dimensional planogram to display optimal decisions regarding items in the assortment by giving them visibility to how customers are shopping, what items are they loyal to, and what items could be substituted. The system identifies opportunities for deleting poor performing items and including good performing items.

FIG. 1 illustrates an exemplary network environment 100 suitable for the planogram generation system, in accordance with an exemplary embodiment. The environment 100 includes a computing system 108 executing a planogram generation (PG) module 120. The computing system 108 is communicatively coupled, via communications network 110, to a database 112. Although the database 112 is shown as remote from computing system 108, in alternative embodiments, database 112 can exist within computing system 108. The database 112 stores information including, but not limited to, information regarding shelves, product categories and items, historical sales data, and customer demographic information for different products. The database 112 may also store rankings of shelf positions, item adjacencies, required facings, and generated planograms for one or more facilities.

In some embodiments, the computing system 108 is communicatively coupled, via the communications network 110, to an application 104 installed on a user computing device 106. For example, the user computing device 106 may be a desktop computing device or a mobile computing device, such as a tablet or a smartphone. The application 104 receives automated planograms that are displayed on an interface of the user computing device 106. In other embodiments, the PG module 120 transmits automated alerts using electronic mail or text messages to the application 104.

The communications network 110 can be any network over which information can be transmitted between devices communicatively coupled to the network. For example, the communication network 110 can be the Internet, an Intranet, virtual private network (VPN), wide area network (WAN), local area network (LAN), and the like.

Figure 2:
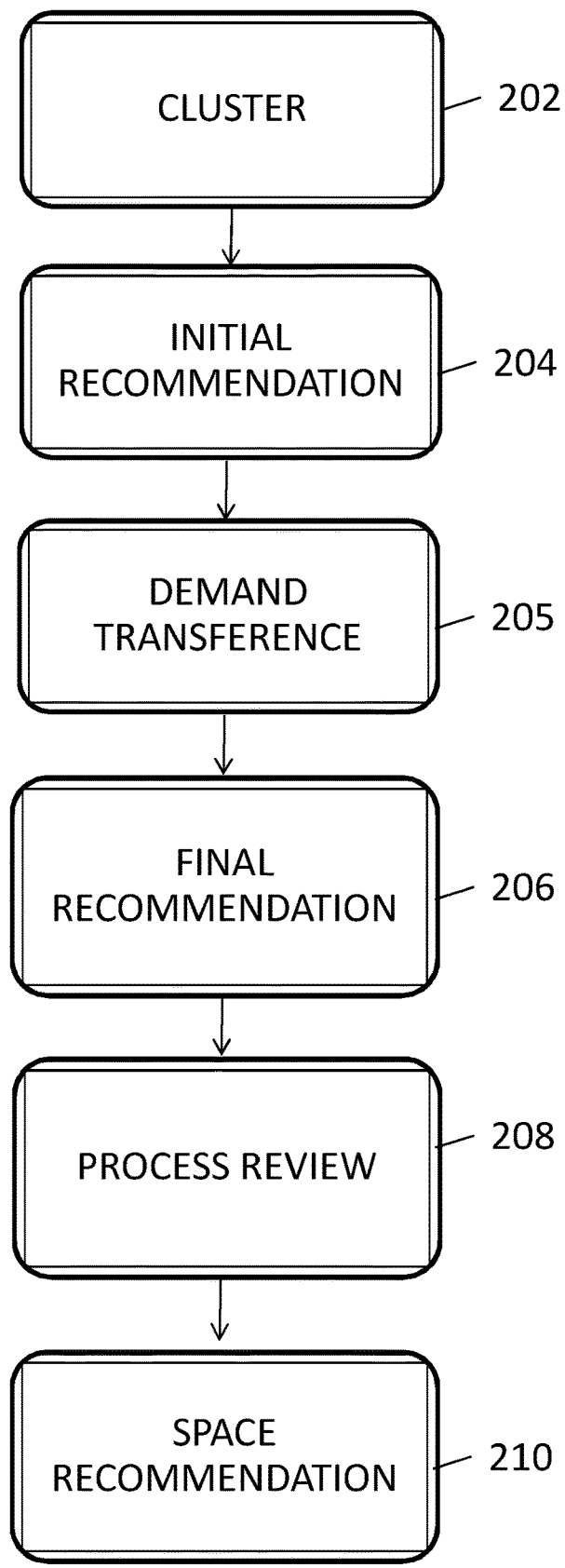
FIG. 2 illustrates assortment planning used in the planogram generation system, in accordance with an exemplary embodiment.

FIG. 2 illustrates assortment planning for a facility, in accordance with an exemplary embodiment. To facilitate understanding, the assortment planning process is broken down into 5 processes: a cluster process 202, an initial recommendation process 204, a demand transference process 205, a final recommendation process 206, a process review 208, and a space recommendation process 210. Each process is described herein.

During the cluster process 202, the PG module is executed by the computing system to group stores into clusters based on store traits. The store traits include, but not limited to, urbanicity, store location, store dimensions, and average income in the store location. The PG module clusters the stores to provide item recommendations at a cluster level. For example, the PG module transmits the same item recommendations to all stores within the cluster, as the recommendations will have a similar effect on performance of items within the stores. Conversely, performing assortment decisions and space recommendation for items at a store level would be a tedious and cumbersome process and vulnerable to errors.

In one embodiment, a k-means clustering method is used to cluster stores into clusters based on store traits. Re-clustering can be performed for outlier stores. Exemplary store traits used for clustering are shown in table 1.

TABLE 1

| Store Traits | Description |
| --- | --- |
| Average_income | Average income in trading area |
| Average_Age | Average age in trading area |
| CTI | Competitor threat index to Total box |
| Urban_flag | Urbanicity of the trading area |
| Pct_Adults_with_Children | Percent of adults with children in trading area |
| Average_Household_Size | Average household size in trading area |
| StrSqFt | Area of the store in square feet |
| Tenure_years | Tenure of the store |
| Density_Index | Density in the trading area |
| Region_nbr_flag | Store region |
| Contribution_sales | Sales contribution of the store to the total sales of all the stores |
| Contribution_qty | Quantity contribution of the store to the total quantity sold in all the stores |

During the initial recommendation process 204, the PG module obtains a first specified percentage of items (for example, the top 70%) from one or more stores that are not within the cluster of stores. The PG module identifies the items within the first specified percentage of items as potential items to add (ADD items) to the store within the cluster of stores.

The PG module further determines initial recommendations for the items based on performances of the items within the cluster of stores. In an exemplary recommendation, the PG module determines an item score (also known as a performance metric) for each item based on sales/linear feet, units/linear feet, and profit/linear feet. The PG module classifies a second specified percentage (for example, a top 80%) of the items at a cluster-category level as items to keep (KEEP items) based on the item scores. A remainder of the items (for example, the bottom 20%) is classified as items to delete (DELETE items) from the stores within the cluster of stores.

In some embodiments, the PG module can analyze each item classified as DELETE for uniqueness based on predefined item attributes. For example, an item may be from a unique seller or associated with a special event, and therefore should not be deleted.

In further embodiments, a user has an option of modifying the thresholds of the first specified percentage and the second specified percentage (for example, changing the first specified percentage from the top 80% to the top 70%).

Based on the above, the PG module provides initial recommendations for each item, classifying each item as KEEP, DELETE, or ADD. The initial recommendations include adding a first set of items from the first specified percentage of items, keeping a second set of items from the plurality of items, and deleting a third set of items from the plurality of items based on a performance of each item in the first specified percentage of items and the plurality of items. The initial recommendations may be displayed in an application or a webpage. The PG module stores at least one intermediate file that includes the initial recommendations in a storage device.

In the demand transference process 205, the PG module incorporates demand transference of DELETE items onto similar KEEP items. Demand transference is an ability of a removed item to transfer its demand to one or more substitution items in an absence of the removed item. The demand transference process 205 is described in further detail in FIGS. 5A-5E.

In the final recommendation process 206, the PG module provides final recommendations for each item, classifying each item as KEEP, DELETE, or ADD. The final recommendations include adding a modified first set of items from the first specified percentage of items, keeping a modified second set of items from the plurality of items, and deleting a modified third set of items from the plurality of items based on the item scores/performance of each item in the first specified percentage of items and the plurality of items, the uniqueness of each item in the third set of items, and the demand transference. The PG module modifies the at least one intermediate file to include the final recommendation.

In some embodiments, the final recommendation can also be based on Nielson scores. The Nielsen score is calculated based on competitor data, which includes competitor stores selling percentage of an item or category and units/store/week of an item or category.

In the process review 208, the user can review and modify the initial recommendations and/or the final recommendations in the application or the webpage. The user can modify the recommendations based on metrics such as Nielsen scores, item scores, uniqueness, and demand transference. During the review of the recommendations, the user has an option to change classifications, for example, changing an item from KEEP to DELETE. The user can also change items classified as ADD to NO, whereby an item classified as NO will not be added. After the review is complete, the user can save the final recommendations with any modifications in the at least one intermediate file in the relational database.

The PG module performs the space recommendation process 210 based on the final recommendations. The final recommendations include any modifications made by the process review 208. In the space recommendation process 210, after finalizing the status of the items (e.g., KEEP, DELETE and ADD), the PG module recommends space for KEEP items based on the updated velocity (with demand transference) of the KEEP items as well as for the ADD items. The space recommendation is performed at a store level and a cluster level. The PG module generates a planogram based on the space recommendations, as further described in FIG. 6.

Figure 3:
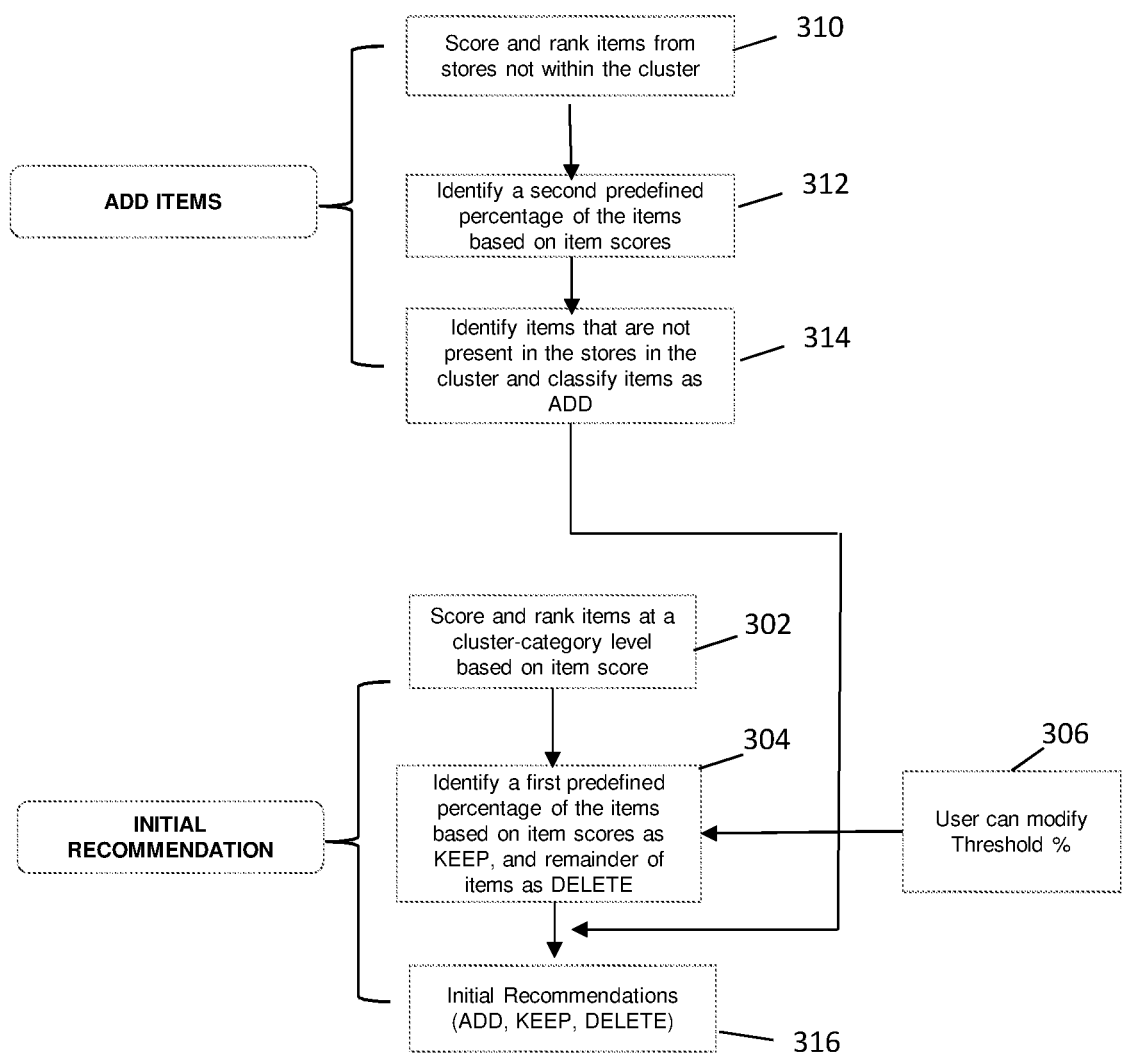
FIG. 3 illustrates an initial recommendation process used in the planogram generation system, in accordance with an exemplary embodiment.

FIG. 3 illustrates the initial recommendation process, in accordance with an exemplary embodiment. At 302, the PG module assigns each item an item score based on a performance of the item. The item score is a performance metric and is calculated based on Sales/Linear Ft., Units/Linear Ft., and Profit/Linear Ft using the following equations:

$$\text{Sales}/LFT \text{ index} = (\text{Sales}/LFT \text{ of item})/(\text{Sales}/LFT \text{ of Category})$$

$$\text{Quantity}/LFT \text{ index} = (\text{Quantity}/LFT \text{ of item})/(\text{Quantity}/LFT \text{ of Category})$$

$$\text{Profit}/LFT \text{ index} = (\text{Profit}/LFT \text{ of item})/(\text{Profit}/LFT \text{ of Category})$$

$$\text{Item score} = \{(\text{Sales}/LFT \text{ index}) + (\text{Quantity}/LFT \text{ index}) + (\text{Profit}/LFT \text{ index})\}/3$$

The PG module ranks items at a cluster-category level based on the item scores.

At 304, the PG module identifies a first predefined percentage (e.g., top 80%) of the items based on the item scores and classifies the first predefined percentage of the items as KEEP. The PG module classifies a remainder of the items (e.g., bottom 20%) as DELETE. At 306, a user is able to modify a threshold for the first predefined percentage.

At 310, the PG module obtains potential add items at a category level from stores not within the cluster. The PG module scores the potential add items, and ranks the potential add items based on the item scores. At 312, the PG module identifies a second predefined percentage of the potential add items based on item scores (for example, the top 20%). At 314, the PG module identifies items within the second predefined percentage that are not present in the stores in the cluster and classifies the items as ADD.

At 316, the PG module provides initial recommendations. The initial classifications classify the items at the cluster-category level as KEEP or DELETE, and include the items classified as ADD. The initial recommendations are listed in at least one intermediate file and stored in the storage device.

Figure 4:
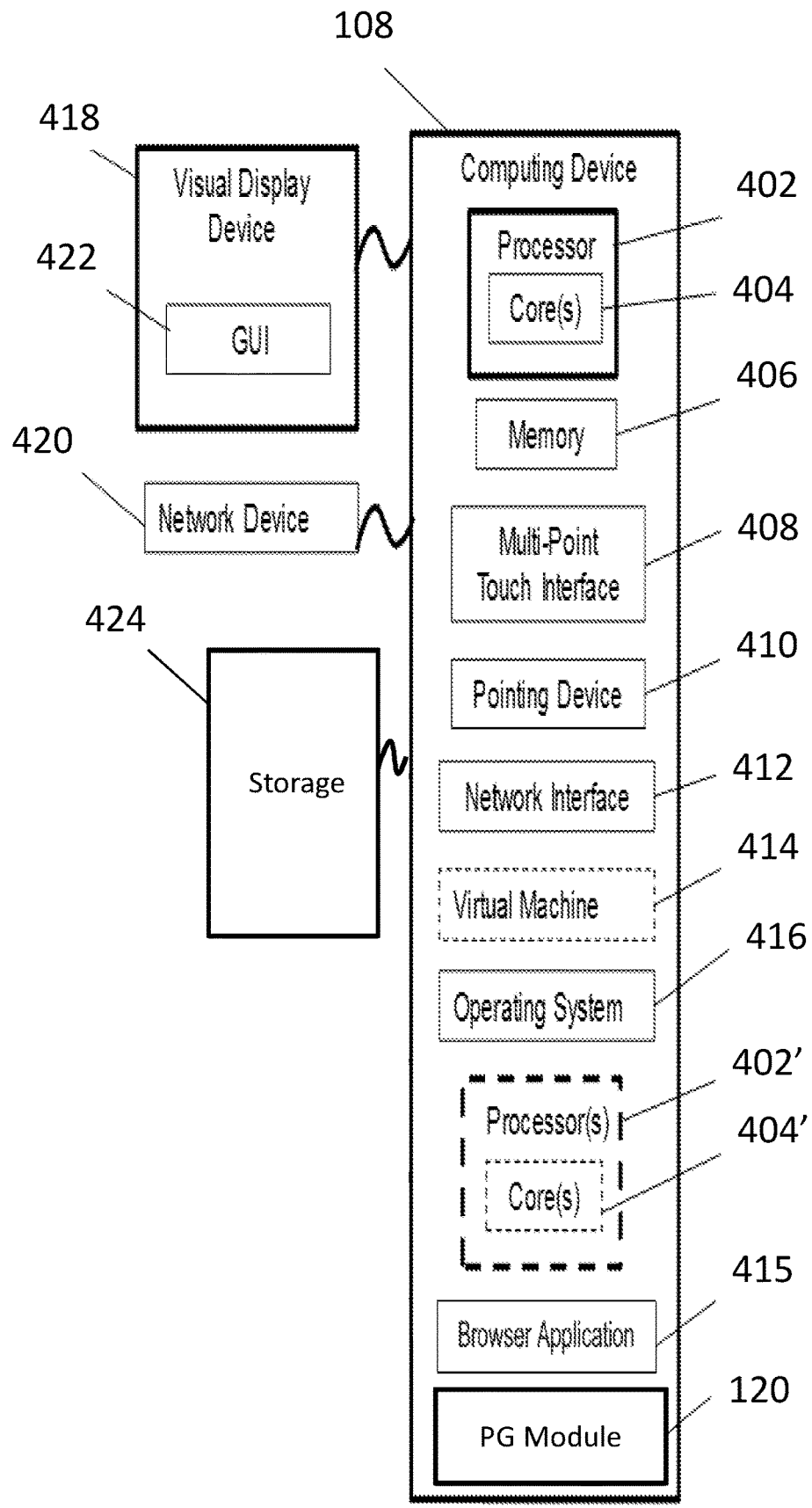
FIG. 4 is a schematic view of a computing system suitable for use in embodiments.

FIG. 4 is a schematic view of a computing system 108 suitable for use in embodiments. The computing system 108 includes an embodiment of the planogram generation (PG) module 120 and one or more non-transitory computer-readable media for storing one or more computer-executable instructions or software for implementing exemplary embodiments. The non-transitory computer-readable media can include, but are not limited to, one or more varieties of hardware memory, non-transitory tangible media (for example, one or more magnetic storage disks, one or more optical disks, one or more USB flashdrives), and the like. For example, a memory 406 included in the computing system 108 can store computer-readable and computer-executable instructions or software for implementing exemplary embodiments. The computing system 108 also includes a processor 402 and an associated core 404, and optionally, one or more additional processor(s) 402' and associated core(s) 404' (for example, in the case of computer systems having multiple processors/cores), for executing computer-readable and computer-executable instructions or software stored in memory 406 and other programs for controlling system hardware. Processor 402 and processor(s) 402' can each be a single core processor or multiple core (404 and 404') processor.

Memory 406 includes a computer system memory or random access memory, such as DRAM, PGAM, EDO RAM, and the like. Memory 406 can include other varieties of memory as well, or combinations thereof. The computing system 108 includes secondary memory 424, such as a hard disk, hard-drive, CD-ROM, or other computer readable media, for storing employee action items. Secondary memory 424 may include one or more storage devices. In some embodiment, the secondary memory 424 may be used for storing any suitable information required to implement exemplary embodiments.

The computing system 108 can include a network interface 412 configured to interface via one or more network devices 420 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or any other device suitable for interfacing the computing system 108 to any variety of networks capable of communication and performing the operations described herein. Moreover, the computing system 108 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Virtualization may be employed in computing system 108 so that infrastructure and resources in the computing device may be shared dynamically. A virtual machine 414 may be provided to handle a process running on multiple processors so that the process appears to be using only one computing resource rather than multiple computing resources. Multiple virtual machines may also be used with one processor.

The computing system 108 can run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 416 can be run in native mode or emulated mode. In an exemplary embodiment, the operating system 416 can be run on one or more cloud machine instances.

In some embodiments, the computing system 108 may include a browser application 415. The browser application can enable a user to, for example, view the planogram. A user may interact with computing system 108 through a visual display device 418, such as a computer monitor or touch screen display integrated into computing system 108, which may display one or more user interfaces 422 that may be provided in accordance with exemplary embodiments. Computing system 108 may include other I/O devices for receiving input from a user, for example, a keyboard or suitable multi-point touch interface 408, and a pointing device 410 (e.g., a mouse). The keyboard and the pointing device may be coupled to the visual display device 418. Computing system 108 may include other suitable conventional I/O peripherals.

FIGS. 5A-5E illustrate a process for determining frequency-based demand transference, in accordance with an exemplary embodiment. Demand transference is an ability of a removed item to transfer its demand to one or more substitution items in an absence of the removed item. This assumes that the elimination of the item increases consumption of an item previously bought. An item with high demand transference can be more easily removed as most of its demand is recovered by one or more substitution items. Consequently, more care is taken with an item with small or zero demand transference.

In summary, the PG module 120 analyzes consumer buying behavior for items in a category, generates a customer decision tree using customer analytics, quantifies performance of the items in the category, identifies one or more substitutable groups, determines a demand that will be transferred between the items in the substitutable groups when one or more items are removed from the category, and determines how much new demand will be created when a new item is introduced in the category. The PG module 120 processes various levels of transactions data from different stores and classifies each item within the category as a set of item attributes (e.g., price, size, brand, etc.). The PG module 120 ranks the item attributes based on levels of importance to the customer using a product decision hierarchy. The ranking is performed using transaction data (or if transaction data is not available using data at store/day level) for the category and how customers are switching (or not switching) between choices available within the attributes. The ranking of attributes facilitates in identifying substitutable groups and the demand transference that can occur within the items. The PG module 120 then either uses a product attribute hierarchy or similarity index at an item pair level to generate a customer decision tree. Once the customer decision tree is generated, the PG module 120 identifies substitutable groups and demand transference within each group. The PG module 120 also lists one or more items that should not be removed due to business or economic reasons and one or more items that are good candidates for removal, thus facilitating assortment planning. The PG module 120 identifies the most eligible item(s) for deletion based on demand that will be transferred to the remaining items.

Figure 5A:
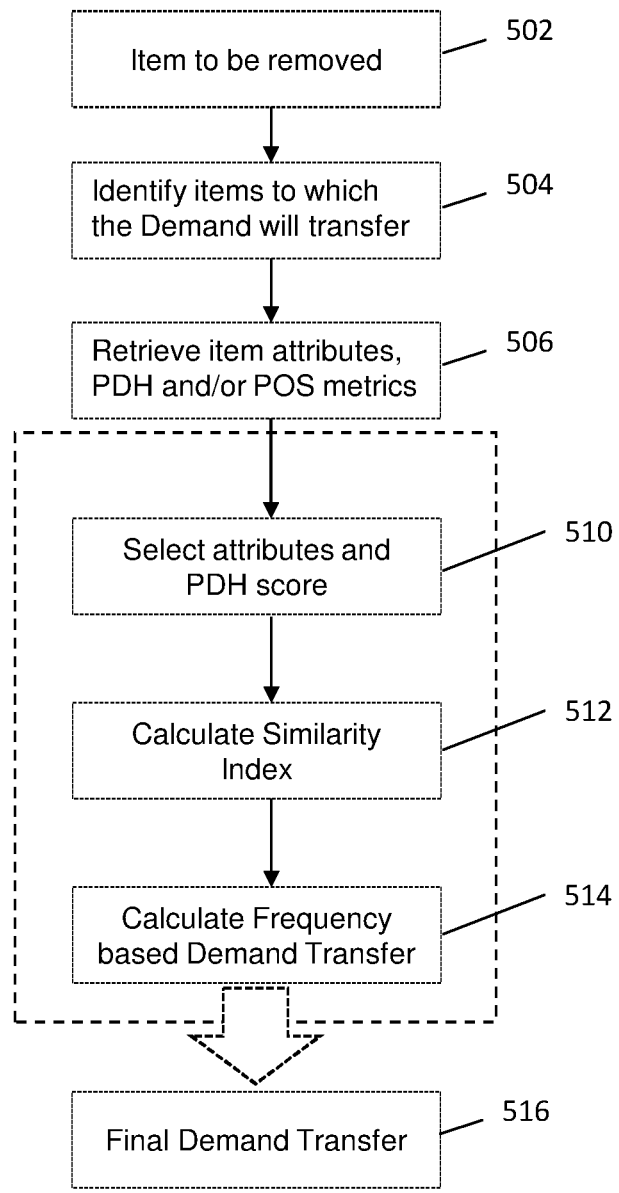

FIG. 5A illustrates a flowchart of determining demand transference, further described in FIGS. 5B-5E. To determine frequency-based demand transference for an item classified as DELETE, the system retrieves a demand for the item, a substitutable demand for the item, a similarity index based on item characteristics of items classified as KEEP and ADD (also known as substitutable items), and a frequency of the substitutable items purchased along with the item.

At 502, the system retrieves the substitutable items, and one or more items classified as DELETE from a database. At 504, the system identifies one or more substitutable items to which a demand for the item classified as DELETE will transfer. At 506, the system retrieves item attributes and POS metrics from a database. At 510, the system selects item attributes and product description hierarchy (PDH) scores.

At 512, the system calculates a similarity index. The similarity index is a weighted index based on a number of matching attributes between the item classified as DELETE and a substitutable item. The PDH scores of each attributes are taken as weights. The top 10 attributes are selected based on the PDH scores. Demand transference is performed for the item classified as DELETE within a node, where the attributes of the item classified as DELETE is matched with substitutable items. The node is created based on the item attributes. The grouping of the items in the node is based on the top attributes of the items.

For example, as shown in FIG. 5B, item 187, item 815, item 814, and item 821 are in one node. The item 187 is classified as DELETE, and the item 815, item 814, and item 821 are classified as KEEP and are substitutable items. If an attribute matches, then the attribute is flagged as 1, otherwise it is flagged as 0. At least 1 item from each group should be "KEEP". If a group has only 1 item with recommendation DELETE, it will be changed to KEEP.

The PDH scores are determined using the attribute scores, as shown in FIG. 5C. A PDH score is normalized by dividing an attribute score for an attribute by a total PDH score of the top 10 attributes. For example, a normalized score of the attribute "Keycat_size"=an attribute score of "Keycat_size" divided by a sum of all attribute scores=8.05/71=11.33%. The normalized similarity index of each attribute is multiplied with match flag. This similarity index is then added to get a final similarity index of each substitution item with respect to the item classified as DELETE, as shown in FIG. 5D. The final similarity index is an index based on similarities in product characteristics.

At 514, the system determines a frequency based demand transference. The frequency demand transference calculation is:

$$\text{Demand Transference} = (1-X_a)*(D_a)*(SI)*(F_b)$$

Where
A=item marked for removal
B=item considered for substitution
$D_a$=Demand for the item marked for removal
    Total sales of item A (Demand of item A)
$X_a$=The Total Share of the item marked for removal
    Total sales of item A/Total Sales of all the items
SI=Index based on the similarities in product characteristics (Similarity index) PDH score is taken to weight the attributes
$F_b$=Total units purchased (B) normalized over the total items purchased item B units purchased/Total Units purchased in all item B A higher value of $X_a$ means higher an importance of the particular item and a lesser chance of substitution and vice versa. Hence, a substitutability index=$(1-X_a)$, and $(1-X_a)*(D_a)$ is a total substitutable demand for A, since the entire demand cannot be transferred, as shown in FIG. 5E. At 516, the system determines a final demand transference.

In an exemplary illustration, the substitution item is item 815. The normalized unit sold ($F_b$)=quantity of substitution item/total quantity=321/825=0.39, and $X_a$=total sales of delete item/total sales of all the item (including the item classified as DELETE)=2481.84/13435.71. Demand Transference $(Sd_j)=(1-X_a)*(D_a)*(SI)*(F_b)$=0.82*2481.84*1*0.39=787.3. Hence, the total demand transferred of item A based on frequency is 787.3. The percentage demand transferred from item A based on frequency=1968.3/2481.84=79%.

Figure 6:
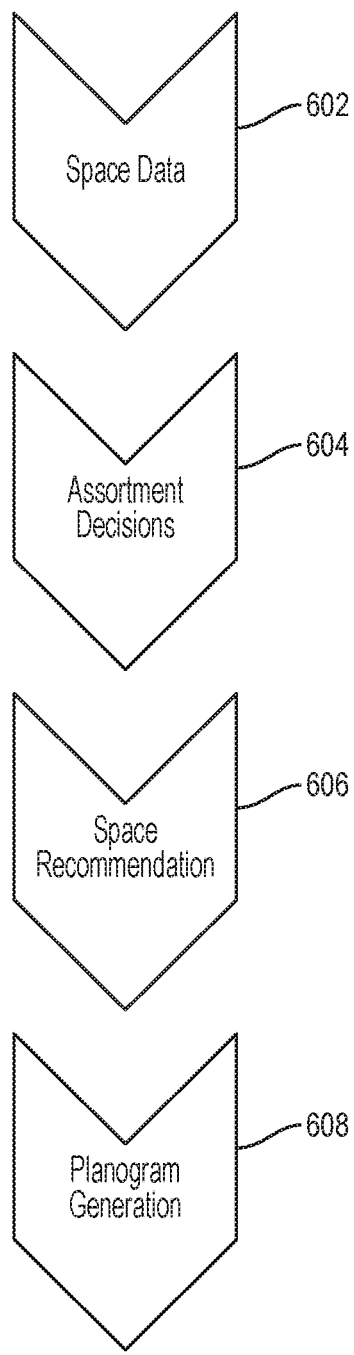
FIG. 6 illustrates a space recommendation process used in the planogram generation system, in accordance with an exemplary embodiment.

FIG. 6 illustrates the space recommendation process, in accordance with an exemplary embodiment. At 602, the PG module retrieves the space data from a database. The space data includes item dimensions (item/tray height, width, and depth), facings, and modular space. The space data at item level for different planogram IDs are pulled or derived. At 604, the assortment decisions are merged with the space data. The item level recommendations are considered. Potential item velocity is computed based on updated units with demand transference. Item velocity is units/store/week for each item across all the stores in the cluster. The cluster level decisions are applied to all the stores in the cluster.

At 606, the PG module obtains the space recommendations from the database, including cluster level standardization. An 80th percentile value of the item velocity across the stores in the cluster is taken as the representative value. The PG module chooses the modular plan ID with maximum item coverage for the cluster as a reference modular. The space calculations are performed based on the reference plan and item velocity For store item level calculations, the PG module retrieves modular information at a store item level. The 80th percentile of the velocity is taken as the representative value. The PG module determines capacity for each store item, where the capacity=(velocity/7)*3.5, when the velocity is greater than 1.5*warehouse pack, where the 3.5 is the days of supply and the (velocity/7) signifies units sold per store per day. The capacity=1.5*warehouse pack, when velocity is less than 1.5*warehouse pack. Based on capacity, the PG module determines facings for each item.

For items classified as DELETE, the facings are kept at 0. Linear feet is calculated as linear feet=facings*width, when merchandise style=unit. Linear Feet is calculated as linear feet=facings*tray width, when merchandise style=tray. Current Linear Feet is calculated as current linear feet=current facings*width, when merchandise style=unit. Current Linear Feet is calculated as current linear feet=current facings*tray width, when merchandise style=tray.

For items classified as ADD, the current facings and current linear feet is kept at 0 since the ADD items come from stores outside the cluster and are not present in the cluster of stores. Cluster level calculations are number of distinct items calculated for modular plan in each cluster. The facings, linear feet, current facings, and current linear feet for each item in a cluster are taken from a modular plan ID in that cluster with maximum number of distinct items.

In 608, the PG module applies the space recommendations and generates the planogram using an intermediate file. The intermediate file may be in Excel format. The PG module may use Prospace. A user selects a Cluster and a Category to generate a corresponding planogram based on the Cluster/Category and the intermediate file. The intermediate file includes planogram item details.

Figures 1, 7C:
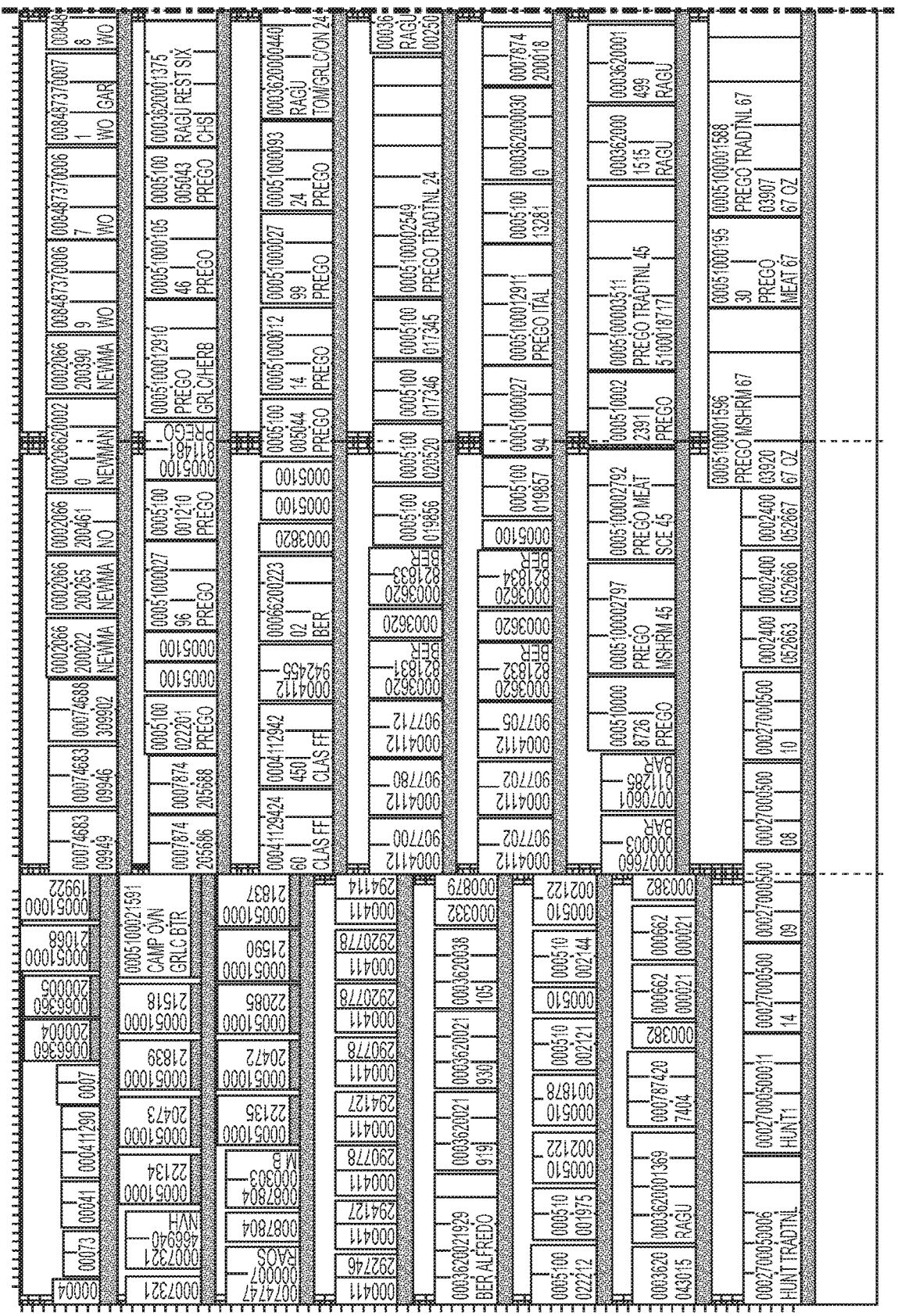
Figures 2, 7C:
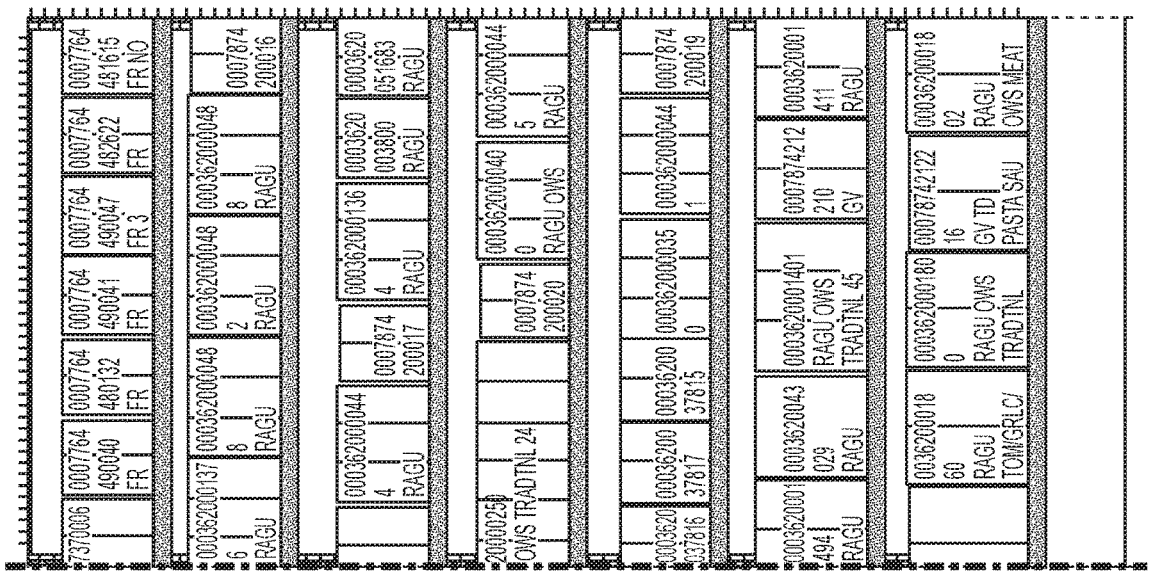

FIGS. 7A-7C illustrate sample item details in the intermediate file and a corresponding sample planogram, in accordance with an exemplary embodiment. FIGS. 7A and 7B illustrates sample item details for four items. The item details includes, but are not limited to an item ID, a cluster number, a category number, a modular category number, a UPC code, a product description, a case size, a UPC score, a movement with transference, a sales score with transference, a horizontal facing, a vertical facing, a height, a width, a depth, a tray height, a tray width, and a tray depth. FIGS. 7C-1-7C-2 illustrate the planogram showing the item placements on the shelves.

Figure 8:
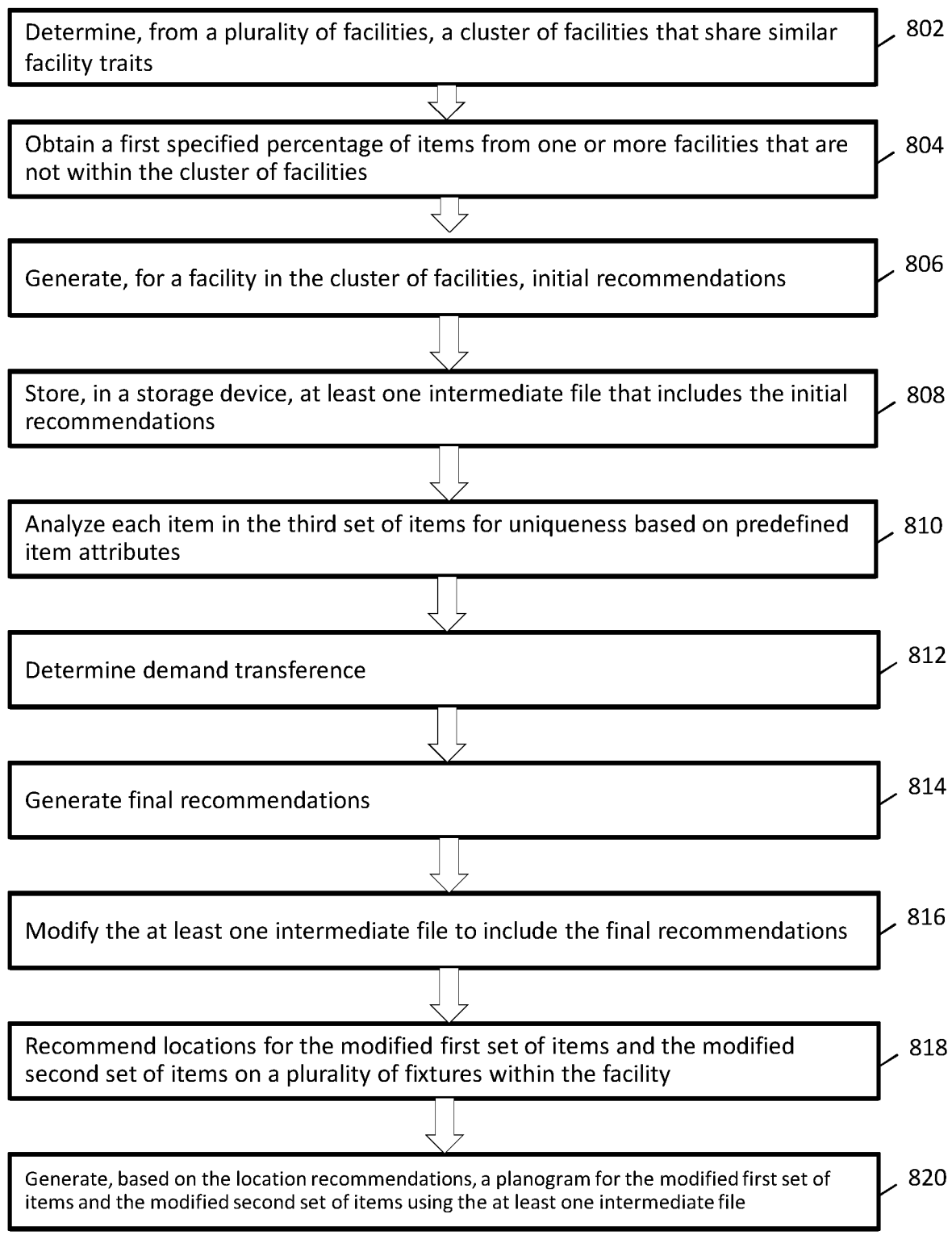
FIG. 8 is a flowchart depicting an exemplary method for generating a two-dimensional planogram image, in accordance with an exemplary embodiment.

FIG. 8 is a flowchart depicting an exemplary method for generating a two-dimensional planogram, in accordance with an exemplary embodiment. The exemplary sequence of steps is preformed using a computing device equipped with a memory and a processor and configured to execute a planogram generation (PG) module. At step 802, the PG module determines, from a plurality of facilities, a cluster of facilities that share similar facility traits. Each facility of the cluster of facilities includes one or more items of a plurality of items and a plurality of fixtures configured to hold the one or more items. At step 804, the PG module obtains a first specified percentage of items from one or more facilities that are not within the cluster of facilities. At step 806, the PG module generates, for a facility in the cluster of facilities, initial recommendations to add a first set of items from the first specified percentage of items, keep a second set of items from the plurality of items, and delete a third set of items from the plurality of items based on a performance of each item in the first specified percentage of items and the plurality of items. At step 808, the PG module stores, in a storage device, at least one intermediate file that includes the initial recommendations.

At step 810, the PG module analyzes each item in the third set of items for uniqueness based on predefined item attributes. At step 812, the PG module determines demand transference of at least one first item in the third set of items onto at least one second item in the second set of items, wherein the at least one first item and the at least one second item share at least one item attribute. At step 814, the PG module generates final recommendations to add a modified first set of items from the first specified percentage of items, keep a modified second set of items from the plurality of items, and delete a modified third set of items from the plurality of items based on the performance of each item in the first specified percentage of items and the plurality of items, the uniqueness of each item in the third set of items, and the demand transference. At step 816, the PG module modifies the at least one intermediate file to include the final recommendations. At step 818, the PG module recommends locations for the modified first set of items and the modified second set of items on a plurality of fixtures within the facility. At step 820, the PG module generates, based on the location recommendations, a planogram for the modified first set of items and the modified second set of items using the at least one intermediate file.

The description herein is presented to enable any person skilled in the art to create and use a computer system configuration and related method and systems for generating a planogram. Various modifications to the example embodiments are readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. A system for generating a two-dimensional planogram, the system comprising:

a plurality of retail stores including a first retail store, a second retail store, and a third retail store, the first retail store having first products displayed using a first plurality of fixtures and the second retail store having second products displayed using a second plurality of fixtures, wherein the first retail store and the second retail store share common facility traits;

wherein the third retail store does not share the common facility traits;

a storage device configured to store intermediate files;

a computing device equipped with a memory and a processor and configured to execute a planogram generation (PG) module that when executed:

determines, from the plurality of retail stores, a cluster of retail stores that includes the first retail store and the second retail store but does not include the third retail store;

obtains a first specified percentage of items from one or more retail stores that are not within the cluster of retail stores including from the third retail store;

generates, for a retail store in the cluster of retail stores, initial recommendations to add a first set of items from the first specified percentage of items, keep a second set of items from the plurality of items, and delete a third set of items from the plurality of items based on a performance of each item in the first specified percentage of items and the plurality of items;

stores, in the storage device, at least one intermediate file that includes the initial recommendations;

analyzes each item in the third set of items for uniqueness based on predefined item attributes;

determines demand transference of at least one first item in the third set of items onto at least one second item in the second set of items, wherein the at least one first item and the at least one second item share at least one item attribute;

generates final recommendations to add a modified first set of items from the first specified percentage of items, keep a modified second set of items from the plurality of items, and delete a modified third set of items from the plurality of items based on the performance of each item in the first specified percentage of items and the plurality of items, the uniqueness of each item in the third set of items, and the demand transference;

modifies the at least one intermediate file to include the final recommendations;

recommends locations for the modified first set of items and the modified second set of items on a plurality of fixtures within the retail store; and generates, based on the location recommendations, a planogram for the modified first set of items and the modified second set of items using the at least one intermediate file;

wherein the planogram is implemented only in stores within the cluster of retail stores including the first retail store and the second retail store of the cluster of retail stores and not at the third retail store by moving and arranging the first products within the first retail store using the first plurality of fixtures according to the planogram, and by moving and arranging the second products within the second retail store using the second plurality of fixtures according to the planogram;

wherein the computing device comprises multiple processors that are effective to provide a virtual machine, and wherein the PG module executes across the multiple processors, and wherein the multiple processors are shared with and execute processes other than the PG module.

2. The system of claim 1, wherein the PG module when executed determines the demand transference by:

ranking the predefined item attributes for each item of the plurality of items based on levels of importance to customers using an item decision hierarchy or a similarity index, wherein the ranking is performed using transaction data to determine how customers are switching between items that include the predefined item attributes;

using the item decision hierarchy or the similarity index at an item pair level to generate a customer decision tree; and identifying substitutable groups between items in the second set of items and items in the third set of items and demand transference within each substitutable group using the customer decision tree.

3. The system of claim 1, wherein the PG module when executed determines the first set of items by identifying items within the first specified percentage of items as potential items to add to the retail store.

4. The system of claim 1, wherein the PG module when executed determines the second set of items and the third set of items by:

determining a performance metric for each item of the plurality of items based on at least one of sales/linear feet, units/linear feet, and profit/linear feet;

classifying a second specified percentage of items in the plurality of items as items to keep based on the performance metrics, wherein the second specified percentage of items is the second set of items; and classifying a remainder of the plurality of items not within the second specified percentage of items as items to delete, wherein the reminder of the items is the third set of items.

5. The system of claim 1, wherein the PG module when executed transmits the final recommendations to each retail store in the cluster of retail stores and not to other retail stores in other clusters.

6. The system of claim 5, wherein each retail store in the cluster of retail stores generates a second planogram based on the final recommendations wherein the second planogram is implemented in each of the retail stores of the cluster of retail stores by moving and arranging products within the retail stores according to the second planogram.

7. The system of claim 1, the system further comprising a mobile application, the PG module when executed:

transmits at least one alert to the mobile application executing on a mobile computing device and associated with an individual in the retail store, the alert including at least one of an image of the planogram.

8. The system of claim 7, wherein the PG module when executed transmits the at least one alert to a facility manager for changing item placement on a fixture or transmits the at least one alert to a replenishment manager for ordering the modified first set of items.

9. The system of claim 7, wherein the computing device is configured to receive user input to increase or decrease the first specified percentage of items.

10. The system of claim 1, wherein the PG module when executed generates the modified second set of items and the modified third set of items by at least one of:

transferring at least one item from the third set of items to the second set of items where the at least one item is unique, or deleting at least one item from the third set of items where the at least one item has a demand transference above a predefined threshold.

11. A method for generating a two-dimensional planogram, the method comprising;

determining, by a computing device equipped with a memory and a processor and configured to execute a planogram generation (PG) module, from a plurality of retail stores that include a first retail store, a second retail store, and a third retail store, the first retail store having first products displayed using a first plurality of fixtures and the second retail store having second products displayed using a second plurality of fixtures, wherein the first retail store and the second retail store share common facility traits, and the third retail store does not share the common facility traits;

obtaining, via the PG module, a first specified percentage of items from one or more retail stores that are not within the cluster of retail stores including from the third retail store;

generating, via the PG module, for a retail store in the cluster of retail stores, initial recommendations to add a first set of items from the first specified percentage of items, keep a second set of items from the plurality of items, and delete a third set of items from the plurality of items based on a performance of each item in the first specified percentage of items and the plurality of items;

storing, in a storage device, at least one intermediate file that includes the initial recommendations;

analyzing, via the PG module, each item in the third set of items for uniqueness based on predefined item attributes;

determining, via the PG module, demand transference of at least one first item in the third set of items onto at least one second item in the second set of items, wherein the at least one first item and the at least one second item share at least one item attribute;

generating, via the PG module, final recommendations to add a modified first set of items from the first specified percentage of items, keep a modified second set of items from the plurality of items, and delete a modified third set of items from the plurality of items based on the performance of each item in the first specified percentage of items and the plurality of items, the uniqueness of each item in the third set of items, and the demand transference;

modifying the at least one intermediate file to include the final recommendations;

recommending, via the PG module, locations for the modified first set of items and the modified second set of items on a plurality of fixtures within the retail store; and generating, via the PG module, based on the location recommendations, a planogram for the modified first set of items and the modified second set of items using the at least one intermediate file;

wherein the planogram is implemented only in stores within the cluster of retail stores including at the first retail store and second retail store of the cluster of retail stores and not at the third retail store by moving and arranging the first products within the first retail store using the first plurality of fixtures according to the planogram, and by moving and arranging the second products within the second retail store using the second plurality of fixtures according to the planogram;

wherein the processor comprises multiple processors that are effective to provide a virtual machine, and wherein the PG module executes across the multiple processors, and wherein the multiple processors are shared with and execute processes other than the PG module.

12. The method of claim 11, further comprising determining the demand transference by:

ranking, via the PG module, the predefined item attributes for each item of the plurality of items based on levels of importance to customers using an item decision hierarchy or a similarity index, wherein the ranking is performed using transaction data to determine how customers are switching between items within the predefined item attributes;

using, via the PG module, the item decision hierarchy or the similarity index at an item pair level to generate a customer decision tree; and identifying, via the PG module, substitutable groups between items in the second set of items and items in the third set of items and demand transference within each substitutable group using the customer decision tree.

13. The method of claim 11, further comprising determining, via the PG module, the first set of items by identifying items within the first specified percentage of items as potential items to add to the retail store.

14. The method of claim 11, further comprising determining the second set of items and the third set of items by:

determining, via the PG module, a performance metric for each item of the plurality of items based on at least one of sales/linear feet, units/linear feet, and profit/linear feet;

classifying, via the PG module, a second specified percentage of items in the plurality of items as items to keep based on the performance metrics, wherein the second specified percentage of items is the second set of items; and classifying, via the PG module, a remainder of the plurality of items not within the second specified percentage of items as items to delete, wherein the reminder of the items is the third set of items.

15. The method of claim 11, further comprising transmitting, via the PG module, the final recommendations to each retail store in the cluster of retail stores and not to other retail stores in other clusters.

16. The method of claim 15, further comprising generating, by each retail store in the cluster of retail stores, a second planogram based on the final recommendations wherein the second planogram is implemented in each of the retail stores of the cluster of retail stores by moving and arranging products within the retail stores according to the second planogram.

17. The method of claim 11, further comprising transmitting, via the PG module, at least one alert to the mobile application executing on a mobile computing device and associated with an individual in the retail store, the alert including at least one of an image of the planogram.

18. The method of claim 17, further comprising transmitting, via the PG module, the at least one alert to a facility manager for changing item placement on a fixture or transmits the at least one alert to a replenishment manager for ordering the modified first set of items.

19. The method of claim 11, further comprising increasing or decreasing, by a user via the computing device, the first specified percentage of items.

20. The method of claim 11, further comprising generating, via the PG module, the modified second set of items and the modified third set of items by at least one of:

transferring at least one item from the third set of items to the second set of items where the at least one item is unique, or deleting at least one item from the third set of items where the at least one item has a demand transference above a predefined threshold.

* * * * *